(12) United States Patent
Hawks et al.

(10) Patent No.: US 11,334,731 B2
(45) Date of Patent: May 17, 2022

(54) SYSTEM AND METHOD OF DECODING A BARCODE USING MACHINE LEARNING

(71) Applicant: UNIVERSITY OF PITTSBURGH—OF THE COMMONWEALTH SYSTEM OF HIGHER EDUCATION, Pittsburgh, PA (US)

(72) Inventors: Justin H Hawks, Sewickley, PA (US); Ervin Sejdic, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 24 days.

(21) Appl. No.: 17/048,828

(22) PCT Filed: Apr. 23, 2019

(86) PCT No.: PCT/US2019/028602
§ 371 (c)(1),
(2) Date: Oct. 19, 2020

(87) PCT Pub. No.: WO2019/209756
PCT Pub. Date: Oct. 31, 2019

(65) Prior Publication Data
US 2021/0124886 A1    Apr. 29, 2021

Related U.S. Application Data

(60) Provisional application No. 62/661,702, filed on Apr. 24, 2018.

(51) Int. Cl.
*G06K 7/10* (2006.01)
*G06N 20/10* (2019.01)
*G06K 7/14* (2006.01)

(52) U.S. Cl.
CPC ....... *G06K 7/10722* (2013.01); *G06K 7/1413* (2013.01); *G06N 20/10* (2019.01)

(58) Field of Classification Search
CPC ... G06K 7/10722; G06K 7/1413; G06N 20/10
See application file for complete search history.

(56) References Cited

U.S. PATENT DOCUMENTS

| 8,523,075 B2 | 9/2013 | Van Der Merwe |
| 2013/0063620 A1 | 3/2013 | Kim et al. |

(Continued)

OTHER PUBLICATIONS

C. Creusot and A. Munawar, "Real-time barcode detection in the wild," in 2015 IEEE Winter Conference on Applications of Computer Vision, pp. 239-245.

(Continued)

*Primary Examiner* — Jamara A Franklin
(74) *Attorney, Agent, or Firm* — Philip E. Levy; Eckert Seamans Cherin & Mellott, LLC

(57) ABSTRACT

A method of decoding a barcode includes capturing an image of the barcode, dividing the image of the barcode into a plurality of rows and columns, each column corresponding to one encoded character of the barcode, using a number of trained image classifiers on each row to determine a predicted character for each column of the row, for each column, determining an output character for the column based on each of the predicted characters associated with the column, and for each column, outputting the output character. Also, a system for decoding a barcode that implements the method.

22 Claims, 4 Drawing Sheets

(56) References Cited

U.S. PATENT DOCUMENTS

2013/0240628 A1 9/2013 van der Merwe et al.
2020/0349440 A1* 11/2020 Gokmen ............... G06N 20/10
2021/0342748 A1* 11/2021 Miyaguchi ............ G06F 7/78

OTHER PUBLICATIONS

W. Sawaya, S. Derrode, M. Ould-Barikalla, and J. Rivaillier, "Detection and iterative decoding of a 2d alphabetic barcode," in 2009 IEEE International Workshop on Machine Learning for Signal Processing, pp. 1-6.

* cited by examiner

SYSTEM AND METHOD OF DECODING A BARCODE USING MACHINE LEARNING

CROSS-REFERENCE TO RELATED APPLICATIONS

This application is a U.S. National Stage Application under 35 U.S.C. § 371 of International Application No. PCT/US2019/028602, filed on Apr. 23, 2019, entitled "System and Method of Decoding a Barcode Using Machine Learning," which claims priority under 35 U.S.C. § 119(e) from U.S. provisional patent application No. 62/661,702, filed on Apr. 24, 2018, entitled "System and Method of Decoding a Barcode Using Machine Learning." the contents of which are incorporated herein by reference.

BACKGROUND OF THE INVENTION

1. Field of the Invention

The present invention relates to barcodes, and, in particular, to a system and method of decoding barcodes using machine learning.

2. Description of the Related Art

A barcode is a machine readable representation of data, such as a serial code. Barcodes have numerous applications. One of the popular uses of barcodes is for identification of a product. For example, the barcode is placed on a product and the serial number encoded in the barcode is associated with the product.

Many traditional barcodes are a series of bars of varying width that encode a serial number. The barcode is divided into a series of elements, each comprised of multiple modules of various widths and each representing one digit of the serial number. The barcode may also have additional segments, such as guard patterns, that denote then beginning or end of a section of the encoded data. Barcodes are typically decoded using barcode scanners. Many types of barcode scanners use edge detection and various signal processing techniques to detect the width of bars in the barcode.

It is beneficial to be able to accurately decode a barcode. Perfect barcodes will generally be able to be decoded accurately. However, it is not uncommon for barcodes in use on products or in other applications to become damaged or degraded. The damage or degradation of a barcode or other imperfections in a barcode can cause it to become unreadable or unable to be accurately read.

SUMMARY OF THE INVENTION

In one embodiment, a method of decoding a barcode is provided. The method includes capturing an image of the barcode, dividing the image of the barcode into a plurality of rows and columns, each column corresponding to one encoded character of the barcode, using a number of trained image classifiers on each row to determine a predicted character for each column of the row, for each column, determining an output character for the column based on each of the predicted characters associated with the column, and for each column, outputting the output character.

In another embodiment, a system for decoding a barcode is provided. The system includes a computing device implementing a number of trained image classifiers. The computing device has a processor apparatus structured and configured to receive an image of the barcode (such as from an image capture device coupled to the computing device), divide the image of the barcode into a plurality of rows and columns, each column corresponding to one encoded character of the barcode, use the number of trained image classifiers on each row to determine a predicted character for each column of the row, for each column, determine an output character for the column based on each of the predicted characters associated with the column, and for each column, output the output character.

A still another embodiment, method of training a number of image classifiers for decoding a barcode includes receiving an image of an encoded character of the barcode, creating a set of preprocessed images of the encoded character by adding effects to the image of the encoded character, and using the set of preprocessed images to train the number of image classifiers to create a number of trained image classifiers.

BRIEF DESCRIPTION OF THE DRAWINGS

A full understanding of the disclosed concept can be gained from the following description of the preferred embodiments when read in conjunction with the accompanying drawings in which.

DETAILED DESCRIPTION OF EXEMPLARY EMBODIMENTS

Figure 1:
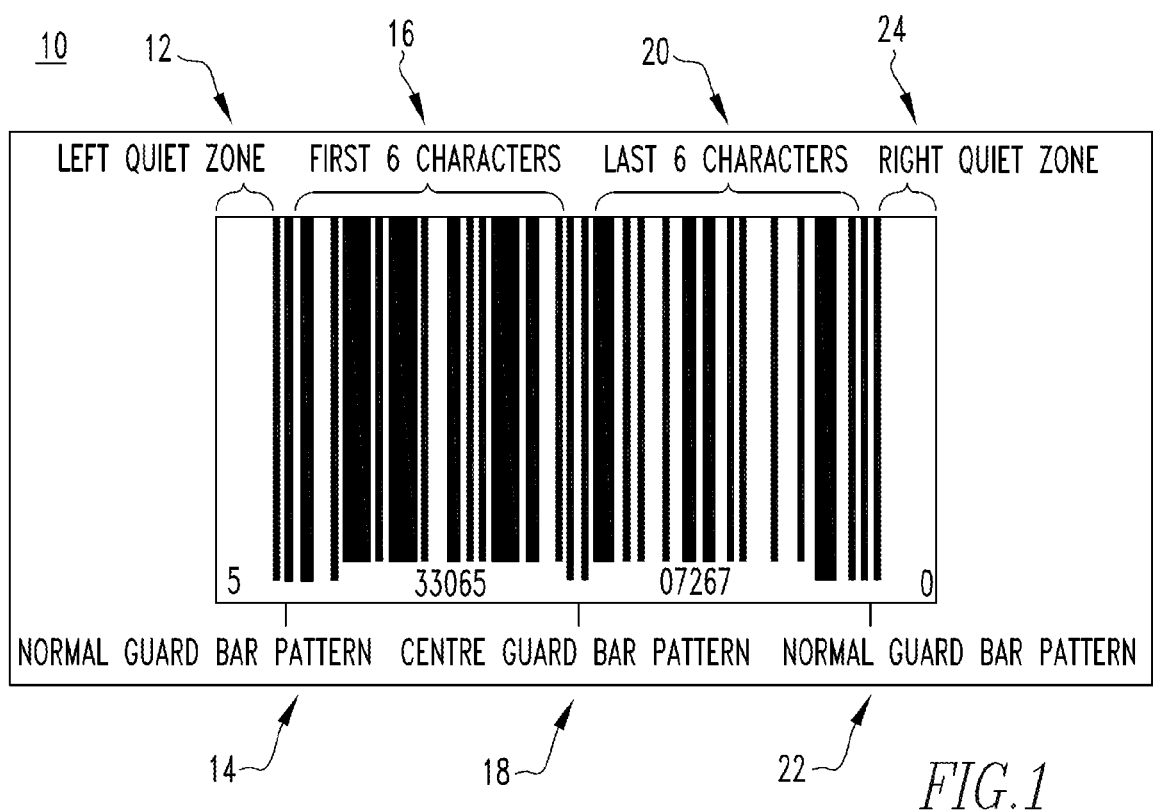
FIG. 1 is an illustration of a barcode in accordance with an example embodiment of the disclosed concept.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, "directly coupled" means that MO elements are directly in contact with each other.

As used herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed herein, the term "processor" shall mean a programmable analog and/or digital device that can store, retrieve, and process data; a microprocessor; a microcontroller; a microcomputer; a central processing unit; or any suitable processing device or apparatus.

As used herein, the term "image classification" shall mean a machine learning technique that receives an image as an input (e.g., an image of a barcode or a portion thereof), and outputs: (i) a particular class or category determined to be associated with the input image (such a one or more characters represented by the barcode or portion thereof), or (ii) a probability that the input image is such a particular class or category associated with the input image, based on a transformation of the original image data through a number of mathematical processing stages or layers.

As used herein, the term "image classifier" shall mean an artificial neural network, such as, without limitation, a convolutional neural network or deep belief network, or a portion thereof, that implements a particular image classification.

As used herein, the terms "component" and "system" are intended to refer to a computer related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The disclosed concept will now be described, for purposes of explanation, in connection with numerous specific details in order to provide a thorough understanding of the disclosed concept. It will be evident, however, that the disclosed concept can be practiced without these specific details without departing from the spirit and scope of this innovation.

FIG. 1 is an example of a UPC-A barcode 10. The width of the barcode 10 is divided into several sections, a left quiet zone 12, a first normal guard bar pattern 14, a first set of data 16, a center guard bar pattern 18, a second set of data 20, a second normal guard bar pattern 22, and a right quiet zone 24. Vertical bars of varying width are dispersed along the barcode 10.

The left and right quiet zones 12,24 do not contain any vertical bars and are placed at the beginning and end of the barcode 10. The normal guard bar patterns 14,22 contain a standard pattern of vertical bars and are placed at the beginning of the first set of data 16 and the end of the second set of data 20, respectively. The center guard bar pattern 18 is also a standard pattern of vertical bars and is placed between the first and second sets of data 16,20.

The first and second sets of data 16,20 are each divided into six equal width segments. Each segment contains a pattern of vertical bars that represent a character. Thus, the first set of data 16 represents a six character code and the second set of data 20 represents a six character code. Together, the first and second sets of data 16,20 represent a twelve character code.

The patterns of vertical bars that represent each character in a UPC-A barcode are known and defined in the GS1 General Specifications (GS1 General Specifications, GS1 General Specifications 17.0.1, 2017), which is incorporated herein by reference in its entirety. Page 229 of the GS1 General Specifications shows the patterns of vertical bars that represent each character of a UPC-A barcode. In the UPC-A barcode 10 of FIG. 1, number set A from page 229 of the GS1 General Specifications is used to encode the characters in the first set of data 16 and number set C from page 229 of the GS1 General Specifications is used to encode the characters in the second set of data 20. In FIG. 1, the first character in the first set of data 16 is "5". The width of the barcode 10 used to encode the character "5" is divided into seven equal width units known as modules. As shown on page 229 of the GS1 General Specifications, the pattern from number set A to encode the character "5" is one module of white, followed by two modules of black, followed by three modules of white, followed by one module of black. As shown in FIG. 1, this pattern is used just after the first normal guard bar pattern 14 to represent the character "5". The first set of data 16 continues with the encoded representations of the characters "3", "3", "0", "6", and "5". By recognizing the patterns of varying widths of vertical bars in the first and second sets of data 16,20, the characters represented by the barcode 10 can be determined.

In accordance with example embodiments of the disclosed concept, machine learning is used to decode barcodes, such as the barcode 10 shown in FIG. 1. An example of applying machine learning, including trained image classifiers, to decode UPC-A barcodes in accordance with an example embodiment of the disclosed concept will be described herein. It will be appreciated by those having ordinary skill in the art that the disclosed concept may be applied to other types of barcodes as well.

Figure 2:
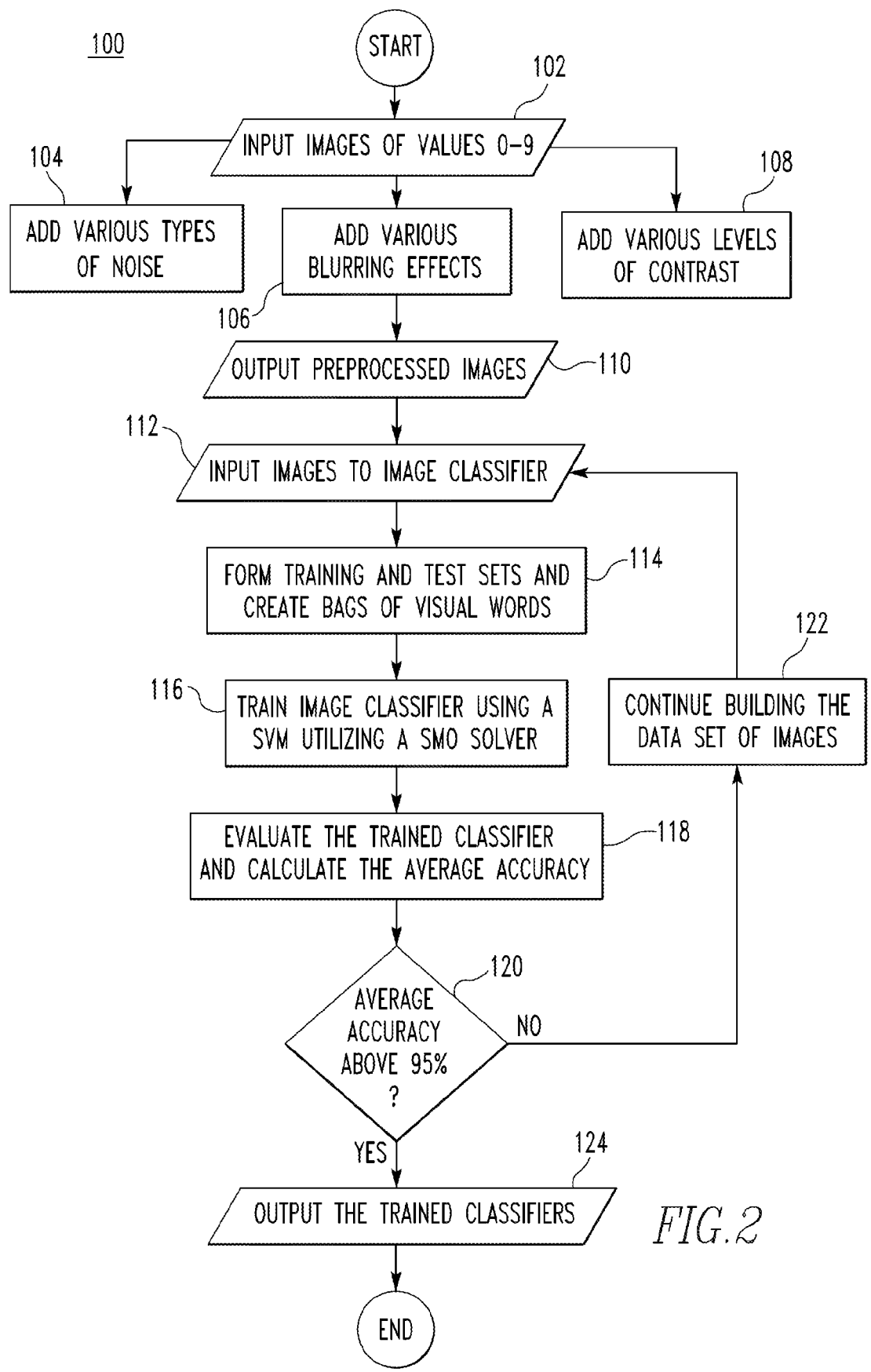
FIG. 2 is a flowchart of a method of training image classifiers in accordance with an example embodiment of the disclosed concept.

In an example embodiment of the disclosed concept, image classifiers (one for each possible character in the barcode in question) are trained and then used to decode barcodes. FIG. 2 is a flowchart of a method 100 of training image classifiers in accordance with an example embodiment of the disclosed concept.

Referring to FIG. 2, to begin the method, images of each of the possible elements of a particular barcode in question are created. For example, a barcode may include the character "0". The barcode is cropped so that an image is created that just contains the section of the barcode representing the character "0". The same process is repeated for the remaining possible characters "1"-"9" of the barcode so that a set of images is created where each image includes the section of the barcode containing one of the corresponding possible characters "0"-"9" that may form part of the barcode in question. At step 102, these images are input to the algorithm.

At steps 104, 106, and 108, the images are subjected to various effects such as added noise 104, added blurring effects 106, or added levels of contrast 108. While steps 104, 106, and 108 are examples of alterations that may be made to the images, it will be appreciated by those having ordinary skill in the art that other types of alterations may be made to the images without departing from the scope of the disclosed concept. As a result of steps 104, 106, and 108, a set of preprocessed images is created, where each preprocessed image is based on one of the original images representing the characters "0"-"9" that is then subjected to preprocessing in steps 104, 106, and 108. At step 110, the preprocessed images are output. The number of preprocessed images may be much larger than the original set of images representing the characters "0"-"9". For example, the original set of images contains 10 images. The output preprocessed images may be 4,000 or any other suitable number depending on the variations of preprocessing that are applied to the original images.

The original images created and output at step 102 are perfect or near perfect representations of the characters "0"-"9" in the barcode. The preprocessed images add various effects, such a noise or blurring, that reduce the perfect representation included in the original images. The preprocessed images help to train the image classifiers (one for each possible character in the barcode in question) to recognize a character in the barcode even when there is an imperfection in a barcode.

In steps 112-122 of FIG. 2, image classifiers are trained. At step 112, the preprocessed images are input to the image classifier system. At step 114, training and test sets are formed and bags of visual words are created. For example, about half of the preprocessed images may be used as training data and about half the preprocessed images may be used as test data. However, it will be appreciated that other splits of the preprocessed images may be employed without departing from the scope of the disclosed concept. A bag of visual words object is created using the training data over all ten image categories for the characters "0"-"9". In the exemplary embodiment, feature point locations for the images are selected using the grid method. Also in the exemplary embodiment, Speeded-Up Robust Features (SURFs) are extracted from the selected feature point locations and 80% of the strongest features are kept from each category. The number of features from each category are automatically balanced by determining which image category has the least number of strongest features and only keeping the same number of the strongest features from each of the other image categories. K-means clustering is used to create the visual vocabulary using the extracted features. At step 116, in the exemplary embodiment, the image classifiers are trained using a Support Vector Machine (SVM) utilizing a Sequential Minimal Optimization (SMO) solver.

At step 118, the trained image classifiers are evaluated and their average accuracy is calculated. At step 120, if the average accuracy of a trained image classifier is above 95%, the trained image classifier is output at step 124. However, if the average accuracy of the trained image classifier is not above 95%, the method proceeds to step 122, where the data set of images is continued to be built. The method then proceeds to step 112 where training of the image classifier is repeated until its average accuracy is above 95%.

The trained image classifiers created by the method of FIG. 2 can then be used recognize the characters included in a barcode, as will be described in more detail below with respect to FIG. 3.

Figure 3:
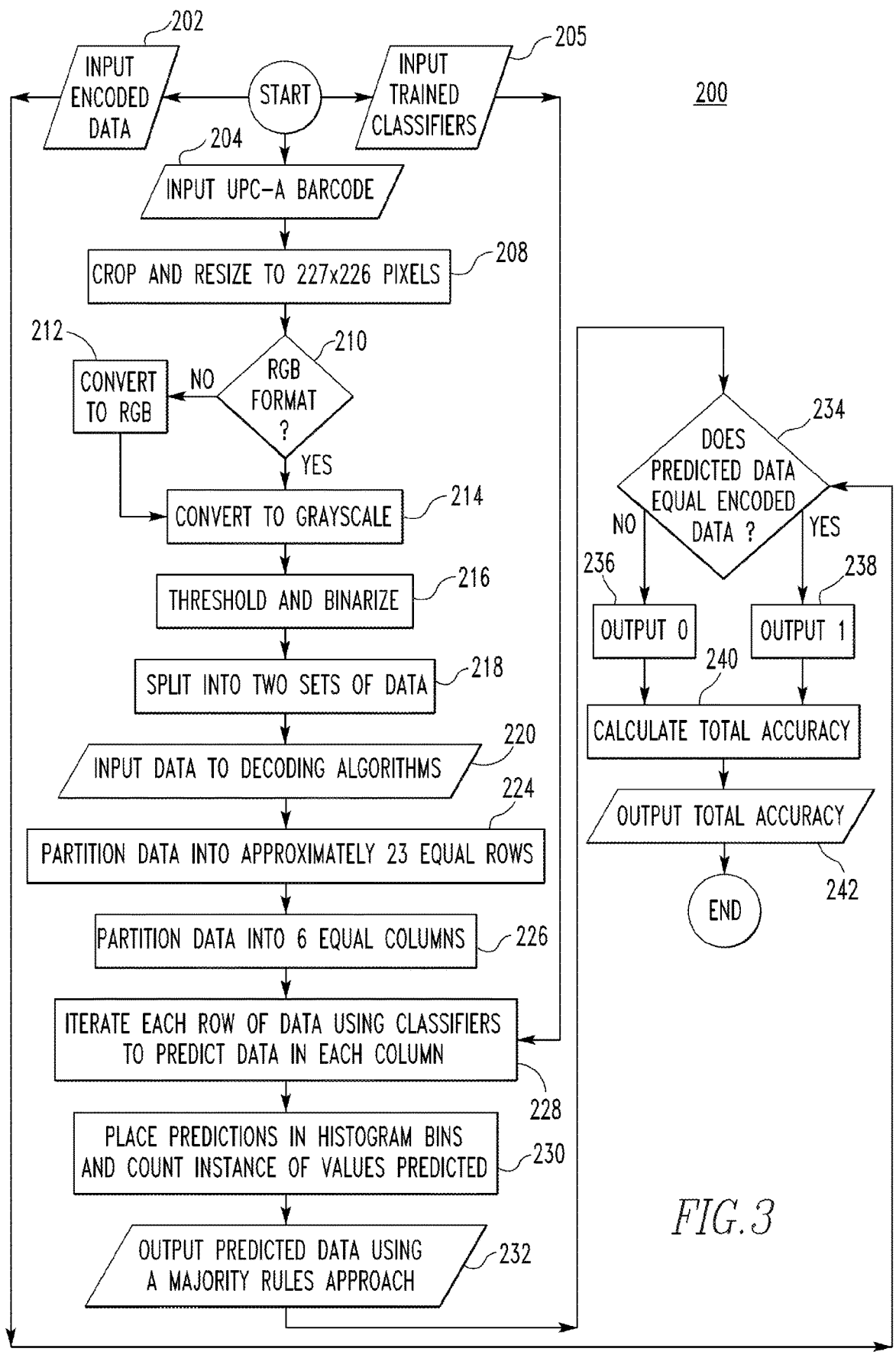
FIG. 3 is a flowchart of a method of using trained image classifiers to decode a barcode in accordance with an example embodiment of the disclosed concept.

FIG. 3 is a flowchart of a method 200 of decoding a barcode using trained image classifiers in accordance with an example embodiment of the disclosed concept. The method of FIG. 3 includes steps for evaluating the accuracy of decoding the barcode. However, it will be appreciated by those having ordinary skill in the art that these steps may be omitted without departing from the scope of the disclosed concept. For example, steps 202 and 234-242 relate to evaluating the accuracy of decoding the barcode and may be omitted without departing from the scope of the disclosed concept. Many of the steps in the method of FIG. 3 may also be modified or omitted without departing from the scope of the disclosed concept.

The method begins at steps 202, 204, and 206. In step 202, the encoded data of the barcode is inputted. The encoded data is the sequence of characters that is represented by the barcode. At step 204, the barcode is inputted. In particular, at step 204, the barcode is inputted as an image. At step 206, the trained image classifiers are inputted. The trained image classifiers may be trained image classifiers that were trained using the method of FIG. 2.

At step 208, the image of the barcode is cropped and resized. For example, the barcode is cropped and resized to a standardized size. At step 210, it is determined whether the cropped image is in red, green, blue (RGB) format. If it is not, the cropped image is converted to RGB format at step 212 and then it is converted to grayscale format at step 214. If the cropped image is already in RGB format, it is just converted to grayscale format at step 214. It will be appreciated by those having ordinary skill in the art that steps 210-214 may be omitted without departing from the scope of the disclosed concept. At step 216, the image is binarized using thresholds.

At step 218, in the exemplary embodiment, the image is divided into two sets of data. For example, the image is divided into the first set of data 16 (see FIG. 1 or 4) representing the first six characters of the barcode and the second set of data 20 (see FIG. 1 or 4) representing the second six characters of the barcode. At step 220, the sets of data are input to decoding algorithms. The decoding algorithms emulate a conventional barcode scanner. The decoding algorithms are used as a comparison against the disclosed concept. Step 220 may be omitted without departing from the scope of the disclosed concept.

In accordance with example embodiments of the disclosed concept, trained image classifiers, such as those trained according to the method of FIG. 2, are used to recognize and decode characters encoded in a barcode. In steps 224-232, the data sets are partitioned and the trained image classifiers are used to recognize and decode the characters included in the barcode. Conventional barcode scanners generally use edge detection to detect the beginning and end of bars in a barcode to decode the barcode. The use of trained image classifiers is fundamentally different and provides improved accuracy in decoding barcodes.

Figure 4:
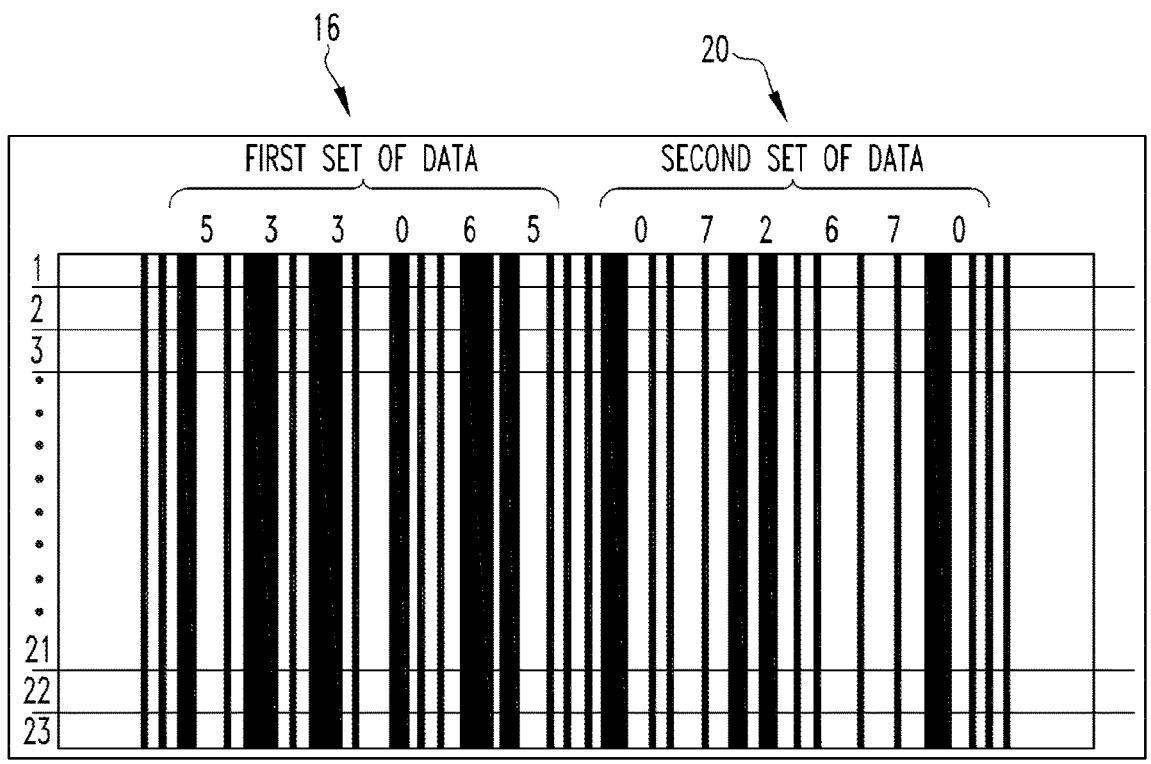
FIG. 4 is an illustration of a barcode partitioned into a number of rows in accordance with an example embodiment of the disclosed concept.

At step 224, the sets of data are partitioned into a number of rows (e.g., without limitation, 23 rows). FIG. 4 shows an example of a barcode divided into 23 rows. At step 226, the sets of data are divided into six equal columns. Each column represents one character in the set of data. For example, in FIG. 4, the first set of data 16 is divided into six columns where the columns respectively include the patterns of bars corresponding to the characters "5", "3", "3", "0", "6", and "5".

At step 228, the trained image classifiers are used on each row to predict the character that is included in each column of the row. In the example barcode shown in FIG. 4, the first column of the first row includes the pattern of bars corresponding to the character "5". The trained image classifier should recognize the pattern of bars in the first column of the first row as corresponding to the character "5" and predict that the character "5" is in the first column of the first row. It will be appreciated that even though the height of the row is only a fraction of the height of the images used to train the image classifier, the trained image classifier is still effective in recognizing the encoded character. In step 228, the trained image classifier proceeds through each row and column of the set of data to predict the characters encoded in each row and column.

At step 230, the predicted characters are placed in histogram bins and the instances of predicted characters in each column are predicted. At step 232, the predicted character for each column is output using a majority rules approach. For example, for a given column, the trained image classifier may predict that the column represents one character in some of the rows of the column and that the column represents another character in some of the other rows of the column. The character that is predicted most often for the column is output as the character that the column is predicted to represent. For example, if the character "5" is predicted in fifteen of the rows of the first column of the first set of data 16 and the character "4" is predicted in eight of the rows of the first column, the character "5" will be output as the character that the first column represents because it appears most often.

The use of machine learning to decode barcodes, in itself, can improve the accuracy in decoding barcodes. For example, using machine learning, such as the trained image classifiers described herein, provides for accurately decoding barcodes that are imperfect in a variety of ways. Additionally, dividing the data of the barcode into a number of rows as previously described improves the accuracy of decoding barcodes. For example, barcodes in practice are subject to imperfections. A marker stripe across a barcode will make a barcode unable to be decoded accurately across a portion of its height. By partitioning the data of the barcode into a number of rows along its height and using the character predicted most often in the number of rows, the method is able to accurately decode a barcode that has a marker stripe across it.

Steps 234-242 of the method of FIG. 3 are steps to verify the accuracy of the method of the disclosed concept. It will be appreciated that steps 234-242 may be omitted without departing from the scope of the disclosed concept. At step 234, the data encoded in the barcode that was provided in step 202 is compared with the data predicted to be in the barcode in step 232. An incorrect prediction is output at step 236 and a correct prediction is output at step 238. At step 240, the accuracy of correctly decoding the barcode is calculated and at step 242 the calculated accuracy is output.

The method of FIG. 3 was applied to a test set of 10,000 UPC-A barcodes of perfect quality, with random white defects, and with random black defects. The accuracy of an emulated conventional barcode scanner was compared with the accuracy of using the trained image classifiers. For the perfect quality barcodes, the emulated conventional barcode scanner and the trained image classifiers both resulted in 100% accuracy. For the set including random white defects, the emulated conventional barcode scanner had an accuracy of 43.39%, while the trained image classifiers had an accuracy of 99.84%. For the set including random black defects, the emulated conventional barcode scanner had an accuracy of 43.10%, while the trained image classifiers had an accuracy of 99.82%. For the test sets of barcodes having random black or white defects, the use of the trained image classifiers in accordance with the disclosed concept showed marked increase in accurately decoding the barcodes.

Machine learning generally refers to the area of using computers or processors to learn by using data such as training data. For example, in the area of decoding barcodes, machine learning may be used to train a computer or processor to recognize the characters encoded in a barcode by providing data of the patterns of bars used to encode characters in the barcode. The methods of FIGS. 3 and 4, and the description herein, provide a particular example of using machine learning to train and use a computer to decode a barcode. However, it will be appreciated by those having ordinary skill in the art that the disclosed concept is not limited to the particular machine learning techniques and formulas described herein. Various machine learning techniques and formulas for training may be employed without departing from the scope of the disclosed concept. Additionally, the subsequent application of the training to decode the barcode may be employed without departing from the scope of the disclosed concept.

Figure 5:
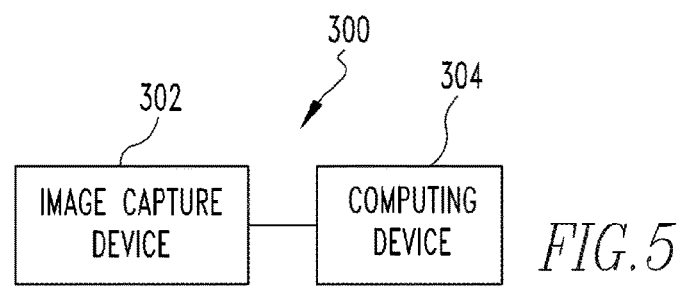
FIG. 5 is a block diagram of a system for decoding a barcode using machine learning according to one particular, non-limiting exemplary embodiment of the disclosed concept.

The disclosed concept encompasses systems and methods of training a computer or processor using machine learning to recognize encoded characters in a barcode, systems and methods of using such training to decode a barcode, or both. For example, the system of decoding a barcode may include an image capturing device to capture an image of the barcode and/or a processing device to use machine learning concepts, such as trained image classifiers, to decode the barcode. FIG. 5 is a block diagram of a system 300 for decoding a barcode using machine learning in which the method of the disclosed concept may be implemented according to one particular, non-limiting exemplary embodiment. System 300 includes an image capture device 302, such as a digital camera or other device that uses digital image sensors (e.g., CCD or CMOS sensors) to create a digital image. System 300 also includes a computing device 304 (described below) coupled to the output of image capture device 302. In such a configuration, image data generated by image capture device 302 is provided to computing device 304 for processing thereby in accordance with the techniques of the disclosed concept as described herein.

Computing device 304 may be, for example, and without limitation, a PC, a laptop computer, a tablet computer, a smartphone, or any other suitable computer processing device structured and configured to perform the functionality described herein. Computing device 304 is structured and configured to store trained image classifiers as described herein. Computing device 304 is also structured and configured to receive barcode image data output by image capture device 302 and process the barcode image data using an embodiment of the method described in detail herein (using the stored image classifiers) in order to decode the barcode from which the image was captured.

Figure 6:
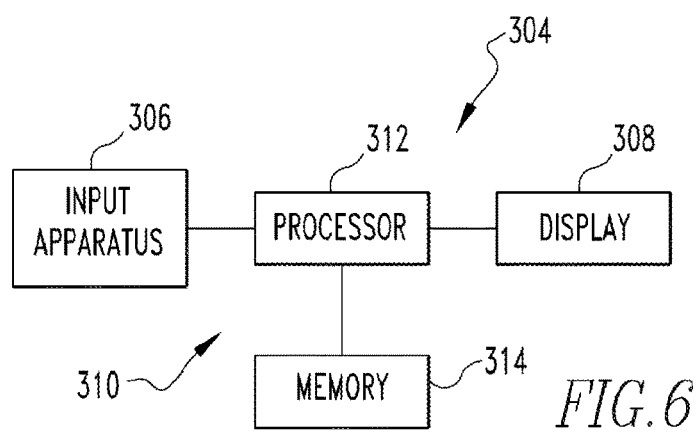
FIG. 6 is a block diagram of computing device according to one particular exemplary embodiment of the disclosed concept.

FIG. 6 is a block diagram of computing device 304 according to one particular exemplary embodiment. As seen in FIG. 6, the exemplary computing device 304 includes an input apparatus 306 (such as a keyboard or touchscreen), a display 308 (such as an LCD), and a processor apparatus 310. A user is able to provide input into processor apparatus 310 using input apparatus 306, and processor apparatus 310 provides output signals to display 308 to enable display 308 to display information to the user, such as, without limitation, decoded barcode information generated using the method of the disclosed concept. Processor apparatus 310 comprises a processor 312 and a memory 314. Memory 314 can be any one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. Memory 314 has stored therein a number of routines that are executable by processor 312. One or more of the routines implement (by way of computer/processor executable instructions) at least one embodiment of the method discussed in detail herein for decoding a barcode using machine learning (e.g., the method of FIG. 2 and/or FIG. 3). In particular, in the exemplary embodiment, the one or more routines implement one or more embodiments of a trained image classifier as described herein for use by the method (e.g., the method of FIG. 3) described herein.

Described below is one particular exemplary implementation of the preprocessing of images and the training of image classifiers (FIG. 2) according to the disclosed concept that was performed by the present inventors. In this exemplary implementation, UPC-A barcodes were generated that were of perfect quality and contained no defects so that at least one instance of each number 0-9 from both Number Set A and Number Set C were present using Barcode Studio (TEC-IT Barcode Studio Version 15.5.1.21844) along with the values from the GSI General Specifications described herein. Paint.NET (dotPDN LLC and Rick Brewster Paint.NET Version 4.0.17) was used to crop an image of each value from each number set respectively. Numerous image processing and photo effects were applied to the cropped images of each value such as various types of blurs, distortions, and noises, as well as adjustments to the brightness and contrast of each image. MATLAB was also used to add Gaussian, Poisson, Salt & Pepper, and Speckle noise to each of the original images with various noise parameters.

Assuming that noise in an image at each pixel is independent, the mean $\bar{I}$ and standard deviation $\sigma$ for each pixel are given by Eqn. 1 & Eqn. 2 respectively for each i,j=0, N-1.

$$\bar{I}(i, j) = \frac{1}{N}\sum_{k=0}^{N-1} I_k(i, j) \tag{1}$$

$$\sigma(i, j) = \left(\frac{1}{N-1}\sum_{k=0}^{N-1}(I_k(i, j) - \bar{I}(i, j))^2\right)^{1/2} \tag{2}$$

Since noise in neighboring pixels of an image is not independent in reality, the auto-covariance of the noise in the image can be assumed to be the same everywhere in the image and we can compute the auto-covariance in Eqn. 3

$$C_{II}(i', j') = \\ \frac{1}{N^2}\sum_{i=0}^{N_{i'}}\sum_{j=0}^{N_{j'}}(I_k(i, j) - \bar{I}(i, j))(I_k(i+i', j+j') - \bar{I}_k(i+i', j+j')) \tag{3}$$

letting $N_{i'}=N-i'-1$ and $N_{j'}=N-j'-1$ for each i',j'=0, ..., N-1.

Random noise n(i,j) can be added to an image pixel value I(i,j) using the additive noise model shown in Eqn. 4.

$$\hat{I}(i,j)=I(i,j)+n(i,j) \tag{4}$$

Gaussian noise was added to each image with default mean and variance of zero and 0.1 respectively, as well as with a mean of 1 and variance of 0.5, mean of 0.5 and variance of 0.5, mean of 1 and variance of 1, and mean of 0.5 and variance of 1 using the distribution shown in Eqn. 5.

$$p(x) = \frac{1}{\sigma\sqrt{2\pi}}e^{-\frac{x^2}{2\sigma^2}} \tag{5}$$

where the variance is equal to the standard deviation squared ($\sigma^2$).

Poisson noise was added to each image using the input pixel values without scaling them. The pixels generated from a Poisson distribution had a mean equal to the pixel value prior to applying the probability distribution function in Eqn. 6.

$$p(I(i, j)) = \frac{\bar{I}(i, j)^{I(i,j)}e^{-\bar{I}(i,j)}}{I(i, j)!} \tag{6}$$

Salt & Pepper noise was added to each image with a default noise density of 0.05 based on Eqn. 7

$$I_{sp}(i, j) = \begin{cases} I(i, j) & x < l \\ I_{min} + y(I_{max} - I_{min}) & x \geq l \end{cases} \tag{7}$$

where x, y∈[0, 1] are two uniformly distributed random variables.

Speckle (multiplicative) noise was also added to each image based on Eqn. 8

$$J=I+n*I \tag{8}$$

where I is the original image, J is the output image with noise added, and n is uniformly distributed random noise with zero mean and variance of 0.05.

Random values of mean, variance, and noise density were generated to randomly add Gaussian, Salt & Pepper, and Speckle noise to the original images. The Image Batch Processor application available in the MATLAB Image Processing and Computer Vision Toolbox was used to convert each of the images for each value from a color (RGB) image to a gray scale image as well as binary instances of each of the images.

Random instances of black and white color were added to the originally cropped images based on the original image size. The cropped images were 88 pixels in height and 14 pixels in width. Random integers from the first and second half of both the width and height of the image were calculated and used to randomly select the location of the area to be changed to either black or white by setting the value of the image in that area equal to 0, 1, or 255 depending on the variable type of the image. A total of 4,000 images of each value for each number set were created to be used for classifier training.

In addition, in this exemplary implementation, image category classifiers for each respective number set were trained as their own independent classifiers. A datastore, or a repository for collections of data that are too large to fit in memory, of the image data for each number set was created using the names of the sub-folders as the label names for the classifier. The data set was randomly split into training and test data using 50% of the images for the training data and 50% of the images for test data.

A bag of visual words object was created using the set of data randomly selected for training over all ten image categories in each number set for values 0-9. Feature point locations for the images were selected using the grid method, where the grid step was [8 8] and the block width was [32 64 96 128]. Speeded-Up Robust Features (SURFs) were extracted from the selected feature point locations and 80% of the strongest features extracted were kept from each category in order to improve clustering as the SURF algorithm consists of both feature detection and representation aspects based on the Hessian matrix, and uses the concept of integral images to quickly compute box type convolution filters. The sum of all pixels in the input image I within some rectangular region containing the origin and x can be represented by the entry of the integral image $I_\Sigma(x)$ at any location $x=(x,y)^T$ as shown in Eqn. 9.

$$I_\Sigma(x) = \sum_{i=0}^{i \leq x}\sum_{j=0}^{j \leq y} I(i, j) \tag{9}$$

The SURF algorithm and the use of integral images is very helpful because the calculation time is independent of the size of the image allowing for the use of large filters. The Hessian matrix is used for detection because of how accurately it performs. For any given point x=(x, y) found in an image I, the Hessian matrix in x at a scale of a is shown in Eqn. 10

$$\mathcal{H}(x, \sigma) = \begin{bmatrix} L_{xx}(x, \sigma) & L_{xy}(x, \sigma) \\ L_{xy}(x, \sigma) & L_{yy}(x, \sigma) \end{bmatrix} \quad (10)$$

where $L_{xx}(x,\sigma)$, $L_{xy}(x,\sigma)$, and $L_{yy}(x,\sigma)$ are the convolution of the Gaussian second order derivative $$\frac{\partial^2}{\partial x^2} g(\sigma)$$

with the image I in point x. The algorithm searches for points where the determinant of the defined Hessian matrix has a local maxima based on Eqn. 11.

$$\det(\mathcal{H}_{approx}) = D_{xx}D_{yy} - (w D_{xy})^2 \quad (11)$$

The relative weight of the filter responses $w$ defined in Eqn. 12 is used in order to balance the determinant expression in Eqn. 11 due to the energy conservation between the Gaussian and approximated Gaussian kernels using the Frobenius norm $|x|_F$ and a n×n filter size.

$$w = \frac{|L_{xy}(\sigma)|_F |D_{yy}(n)|_F}{|L_{yy}(\sigma)|_F |D_{xy}(n)|_F} \quad (12)$$

The number of features from each category were automatically balanced by determining which image category had the least number of strongest features and only keeping the same number of the strongest features from each of the other image categories. K-Means clustering was used to create a visual vocabulary using the extracted features due to the many advantages the algorithm provides such as that it is simple and fast, highly efficient and flexible, yields respectable results for convex clusters, and provides good geometrical and statistical meaning. The following equations were used for the local-maximum-likelihood estimates $\hat{\mu}_i$, $\hat{\Sigma}_i$, and $\hat{P}(\omega_i)$:

$$\hat{P}(\omega_i) = \frac{1}{n} \sum_{k=1}^{n} \hat{P}(\omega_i | x_k, \hat{\theta}) \quad (13)$$

$$\hat{\mu}_i = \frac{\sum_{k=1}^{n} \hat{P}(\omega_i | x_k, \hat{\theta}) x_k}{\sum_{k=1}^{n} \hat{P}(\omega_i | x_k, \hat{\theta})} \quad (14)$$

$$\hat{\Sigma}_i = \frac{\sum_{k=1}^{n} \hat{P}(\omega_i | x_k, \hat{\theta})(x_k - \mu_i)(x_k - \mu_i)^t}{\sum_{k=1}^{n} \hat{P}(\omega_i | x_k, \hat{\theta})} \quad (15)$$

where $$\hat{P}(\omega_i | x_k, \hat{\theta}) = \frac{|\hat{\Sigma}_i|^{-1/2} \exp\left[-\frac{1}{2}(x_k - \mu_i)^t \hat{\Sigma}_i^{-1}(x_k - \mu_i)\right] \hat{P}(\omega_i)}{\sum_{j=1}^{c} |\hat{\Sigma}_j|^{-1/2} \exp\left[-\frac{1}{2}(x_k - \mu_j)^t \hat{\Sigma}_j^{-1}(x_k - \mu_j)\right] \hat{P}(\omega_j)} \quad (16)$$

The algorithm computes the squared Euclidean distance $\|x_k - \hat{\mu}_i\|^2$ and finds the mean $\hat{\mu}_m$ nearest to $x_k$ and then approximates $\hat{P}(\omega_i | x_k, \hat{\theta})$ as shown in Eqn. 17 and uses this approximation and iterating Eqn. 14, the algorithm then finds $\hat{\mu}_1, \ldots, \hat{\mu}_c$.

$$\hat{P}(\omega_i | x_k, \hat{\theta}) \approx \begin{cases} 1 & \text{if } i = m \\ 0 & \text{otherwise} \end{cases} \quad (17)$$

The image classifiers were trained using a Support Vector Machine (SVM). In general, the main task when training SVMs is to solve the quadratic optimization problem when given instances $x_i$, $i=1, \ldots, l$ with labels=$y_i \in 1, -1$ shown in Eqn. 18

$$\begin{aligned} \underset{\alpha}{\text{minimize}} \quad & f(\alpha) = \frac{1}{2} \alpha^T Q \alpha - e^T \alpha \\ \text{subject to} \quad & 0 \leq \alpha_i \leq C, i = 1, \ldots, i, \\ & y^T \alpha = 0 \end{aligned} \quad (18)$$

where e is the vector of all ones, C is the upper bound of all variables, Q is an l by l symmetric matrix with $Q_{ij} = y_i y_j K(x_i, x_j)$, and $K(x_i, x_j)$ is the kernel function.

The SVM classifier finds a hyperplane to separate the two-class data with maximal margin which is defined as the distance from the separating hyperplane to the closest training point. Thus, this hyperplane results in minimizing the risk of misclassification of test data. In the present case specifically, the classification function is found for given observations X and corresponding labels Y shown in Eqn. 19

$$f(x) = \text{sign}(w^T x + b) \quad (19)$$

where w and b are parameters of the hyperplane. Due to the fact that data sets are not always linearly separable, a mapping function $\phi$ is made using the original data space of X that is used to map the data to another feature space which can have an infinite dimension and the kernel function is introduced as shown in Eqn. 20

$$K(u, v) = \phi(u) \cdot \phi(v) \quad (20)$$

which is can be used to express the decision function shown in Eqn. 21

$$f(x) = \text{sign}\left(\sum_i y_i \alpha_i K(x, x_i) + b\right) \quad (21)$$

where $x_i$ are the training features from the data space X, $y_i$ is the label of $x_i$, and the parameter $\alpha_i$ are equal to zero for most i. The number of occurrences of each keypoint $v_i$ for the vocabulary V in each image $I_i$ are used to form binned histograms which are used as the input features $x_i$ to the SVM.

A Sequential Minimal Optimization (SMO) solver was used which is an extreme case and restricts the subset of the vector being optimized to only having two elements using the following algorithm:
1) Find $\alpha^i$ as the initial feasible solution. Set k=1.
2) If $a^k$ is an optimal solution of (1), stop. Otherwise, find a two-element working set B=i,j⊂1, . . . , 1. Define N=1, . . . , 1 B and $\alpha_B^k$ and $\alpha_N^k$ to be sub-vectors of $\alpha^k$ corresponding to B and N, respectively.
3) Solve the following sub-problem with the variable $\alpha_B$:

$$\text{minimize } \frac{1}{2}[a_B^T(\alpha_N^k)^T]\begin{bmatrix} Q_{BB} & Q_{BN} \\ Q_{NB} & Q_{NN} \end{bmatrix}\begin{bmatrix} \alpha_B \\ \alpha_N^k \end{bmatrix} - [e_B^T e_N^T]\begin{bmatrix} \alpha_B \\ \alpha_N^k \end{bmatrix} =$$

$$\frac{1}{2}\alpha_B^T Q_{BB}\alpha_B + (-e_B + Q_{BN}\alpha_N^k)^T \alpha_B + \text{constant} =$$

$$\frac{1}{2}[\alpha_i \alpha_j]\begin{bmatrix} Q_{ii} & Q_{ij} \\ Q_{ij} & Q_{jj} \end{bmatrix}\begin{bmatrix} \alpha_i \\ a_j \end{bmatrix} + (-e_B + Q_{BN}\alpha_N^k)^T\begin{bmatrix} \alpha_I \\ \alpha_J \end{bmatrix} + \text{constant } 0 \le$$

$$\alpha_i \alpha_j \le C,$$

Subject to $y_i\alpha_i + y_j\alpha_j = -y_N^T \alpha_N^k$

Where $$\begin{bmatrix} Q_{BB} & Q_{BN} \\ Q_{NB} & Q_{NN} \end{bmatrix}$$

is the permutation of the matrix Q.
4) Set $\alpha_B^{k+1}$ to be the optimal solution of II-C and $\alpha_N^{k+1} \equiv \alpha_N^k$. Set k←k+1 and go to Step 2.

Due to the simple nature of the classifier being trained and the fact that it is a two-variable problem, only a few components were required to be updated at each iteration and therefore there was no need to worry about slow convergence times making this the preferable optimization routine to use. Using a linear kernel, the elements of the Gram matrix were computed using Eqn. 22

$$G(x_j, x_k) = x_j^T x_k \quad (22)$$

where the Gram matrix of a set of n vectors $\{x_i, \ldots, x_n; x_i \in R^P\}$ is an n-by-n matrix with element (j,k) defined as $G(x_i, x_k) = \langle \phi(x_j), \phi(x_k) \rangle$ where $G(x_j, x_k)$ is an inner product of the transformed predictors using the kernel function φ.

In an effort to prevent overfitting, a box constraint value of 1.1 was used based on Eqn. 23

$$C_j = nC_0 w_j^* \quad (23)$$

where $C_j$ is the box constraint of observation j, n is the training sample size, $C_0$ is the initial box constraint, and $w_j^*$ is the total weight of observation j in order to control the maximum penalty imposed on margin-violating observations. Increasing this value caused the SVM classifier to assign fewer support vectors and did not significantly increase the training time of the classifiers.

Upon completion of the classifier training, an image category classifier containing the number of categories and category labels for the inputs from the image data store previously created by encoding features for the total number of images in the training data from each image category was returned for each trained classifier. The trained classifiers were evaluated using the test data previously defined to obtain the confusion matrix for each of the classifiers based on Eqn. 24

$$M_{ij} = \frac{|\{I_k \in C_j : h(I_k) = i\}|}{|C_j|} \quad (24)$$

where i,j∈1, . . . , $N_c$, $C_j$ is the set of test images from category j and $h(I_k)$ is the category which obtained the highest classifier output for image $I_k$. The overall error rate was calculated using Eqn. 25.

$$R = 1 - \frac{\sum_{j=1}^{N_c} \lceil C_j \rceil M_{jj}}{\sum_{j=1}^{N_c} |C_j|} \quad (25)$$

The row indices of the matrices correspond to the known labels and the columns correspond to the predicted labels. The average accuracy of the trained classifiers was calculated by taking the mean of the diagonal elements of the obtained confusion matrices. The classifiers were tested by categorizing new images not contained in the test or training data by computing the K-step ahead output of the trained classifiers using the new images and 10-fold cross validation.

It will be appreciated by those having ordinary skill in the art that the disclosed concept as described in detail herein is not limited to a particular type of barcode. While the disclosed concept is described with respect to a UPC-A barcode, it will be appreciated by those having ordinary skill in the art that the disclosed concept may be employed with respect to other types of barcodes without departing from the scope of the disclosed concept. It will also be appreciated that the disclosed concept may be applied to not only one-dimensional type barcodes, such as UPC-A barcodes, but also to two-dimensional type barcodes, such as QR codes. For example, image classifiers may be trained to recognize the characters used in a QR code and the trained image classifiers may be subsequently used to decode QR codes.

One or more aspects of the disclosed concept can also be embodied as computer readable codes on a tangible, non-transitory computer readable recording medium. The computer readable recording medium is any data storage device that can store data which can be thereafter read by a computer system. Non-limiting examples of the computer readable recording medium include read-only memory (ROM), non-volatile random-access memory (RAM), CD-ROMs, magnetic tapes, floppy disks, disk storage devices, and optical data storage devices.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of decoding a barcode, the method comprising:
   capturing an image of the barcode;
   dividing the image of the barcode into a plurality of rows and columns, each column corresponding to one encoded character of the barcode;
   using a number of trained image classifiers on each row to determine a predicted character for each column of the row;
   for each column, determining an output character for the column based on each of the predicted characters associated with the column; and
   for each column, outputting the output character.

2. The method of claim 1, wherein for each column, the determining the output character for the column comprises determining which predicted character is predicted most often in the rows of the column, and, for each column, setting the output character for the column to be the predicted character that is predicted most often in the rows of the column.

3. The method of claim 1, wherein the barcode is a UPC-A barcode.

4. The method of claim 1, wherein the rows have equal heights and the columns have equal widths.

5. The method of claim 4, wherein training the number of image classifiers includes using a support vector machine utilizing sequential minimal optimization to train the number of image classifiers.

6. The method of claim 4, wherein training the number of image classifiers includes selecting feature point locations from training data using a grid method to train the number of image classifiers.

7. The method of claim 6, further comprising extracting Speeded-Up Robust Features from the selected feature point locations to train the number of image classifiers.

8. The method of claim 1, further comprising:
   training a number of image classifiers to create the number of trained image classifiers.

9. The method of claim 8, wherein training the number of image classifiers includes:
   creating an image of an encoded character of the barcode;
   creating a set of preprocessed images of the encoded character by adding effects to the image of the encoded character; and
   using the set of preprocessed images to train the number of image classifiers.

10. The method of claim 9, wherein the effects are added by adding one or more of noise, blurring, or contrast to the image of the encoded character.

11. A computer program product, comprising a non-transitory computer usable medium having a computer readable program code embodied therein, the computer readable program code being adapted and configured to be executed to implement a method of decoding a barcode as recited in claim 1.

12. A system for decoding a barcode, comprising:
   a computing device implementing a number of trained image classifiers, the computing device having a processor apparatus structured and configured to:
   receive an image of the barcode;
   divide the image of the barcode into a plurality of rows and columns, each column corresponding to one encoded character of the barcode;
   use the number of trained image classifiers on each row to determine a predicted character for each column of the row;
   for each column, determine an output character for the column based on each of the predicted characters associated with the column; and
   for each column, output the output character.

13. The system according to claim 12, further comprising an image capture device coupled to the computing device, the image capture device being configured generate the image of the barcode.

14. The system of claim 12, wherein for each column, the output character for the column is determined by determining which predicted character is predicted most often in the rows of the column, and, for each column, setting the output character for the column to the predicted character that is predicted most often in the rows of the column.

15. The system of claim 12, wherein the barcode is a UPC-A barcode.

16. The system of claim 12, wherein the rows have equal heights and the columns have equal widths.

17. A method of training a number of image classifiers for decoding a barcode, comprising:
   receiving an image of an encoded character of the barcode;
   creating a set of preprocessed images of the encoded character by adding effects to the image of the encoded character; and
   using the set of preprocessed images to train the number of image classifiers to create a number of trained image classifiers.

18. The method of claim 17, wherein the using the set of preprocessed images to train the number of image classifiers includes using a support vector machine utilizing sequential minimal optimization to train the number of image classifiers.

19. The method of claim 17, wherein the effects are added by adding one or more of noise, blurring, or contrast to the image of the encoded character.

20. The method of claim 17, wherein training the number of image classifiers includes selecting feature point locations from training data using a grid method to train the number of image classifiers.

21. The method of claim 20, further comprising extracting Speeded-Up Robust Features from the selected feature point locations to train the number of image classifiers.

22. A computer program product, comprising a non-transitory computer usable medium having a computer readable program code embodied therein, the computer readable program code being adapted and configured to be executed to implement a method training a number of image classifiers as recited in claim 17.

* * * * *